US011027605B1

(12) United States Patent
Myers (10) Patent No.: US 11,027,605 B1
(45) Date of Patent: Jun. 8, 2021

(54) VIBRATION ATTENUATING ENGINE MOUNTING APPARATUS

(71) Applicant: Douglas D. Myers, Jacksonville, FL (US)

(72) Inventor: Douglas D. Myers, Jacksonville, FL (US)

(*) Notice: Subject to any disclaimer, the term of this patent is extended or adjusted under 35 U.S.C. 154(b) by 0 days.

(21) Appl. No.: 16/824,211

(22) Filed: Mar. 19, 2020

(51) Int. Cl.
| | | |
|---|---|---|
| *B60K 5/12* | (2006.01) | |
| *B60K 15/03* | (2006.01) | |
| *B60K 13/04* | (2006.01) | |
| *F16F 15/02* | (2006.01) | |
| *F16M 3/00* | (2006.01) | |
| *F04B 43/02* | (2006.01) | |
| *B60P 3/00* | (2006.01) | |

(52) U.S. Cl.
CPC ............... *B60K 5/12* (2013.01); *B60K 13/04* (2013.01); *B60K 15/03* (2013.01); *F16F 15/02* (2013.01); *B60P 3/00* (2013.01); *F04B 43/02* (2013.01); *F16M 3/00* (2013.01)

(58) Field of Classification Search
CPC .......... B60K 13/04; F16M 3/00; F04B 43/025
USPC ................................................. 248/638, 671
See application file for complete search history.

(56) References Cited

U.S. PATENT DOCUMENTS

| | | | | |
|---|---|---|---|---|
| 405,523 | A * | 6/1889 | Barton ..................... | H02K 5/00 248/671 |
| 1,891,408 | A * | 12/1932 | Gorman ................... | F04B 43/02 417/566 |
| 2,810,536 | A * | 10/1957 | Cunningham ........... | F16M 5/00 248/671 |
| 3,968,854 | A * | 7/1976 | Gordon ................... | B60K 13/04 181/269 |
| 5,240,222 | A * | 8/1993 | Seeley .................... | F16F 15/08 248/610 |
| 5,687,948 | A | 11/1997 | Whiteford et al. | |
| 7,195,094 | B2 * | 3/2007 | Street ...................... | E01H 5/04 180/291 |
| 9,121,400 | B1 | 7/2015 | Myers | |
| 10,161,107 | B2 * | 12/2018 | Namai ..................... | E02F 9/00 |
| 10,533,474 | B2 * | 1/2020 | Kimura ................... | B60K 13/04 |
| 2013/0335714 | A1 * | 12/2013 | Zhu ........................ | G03B 21/14 353/98 |
| 2015/0275480 | A1 * | 10/2015 | Iwamoto ................. | E02F 9/16 180/291 |
| 2016/0160469 | A1 * | 6/2016 | Panneer ................. | E02F 3/7609 180/69.2 |
| 2018/0073672 | A1 * | 3/2018 | Varner .................... | F04B 35/06 |
| 2019/0078724 | A1 * | 3/2019 | Haight ................... | F04D 29/628 |

* cited by examiner

*Primary Examiner* — Bradley Duckworth
(74) *Attorney, Agent, or Firm* — Law Office of Mitchell Ghaneie, P.A.; Mitchell Ghaneie; Christopher Roberts (57) ABSTRACT

This unique and novel invention is related to supporting an engine on a high-volume double diaphragm pump such that the engine mounting apparatus may be integrally attached directly to the fuel tank of the high-volume double diaphragm pump. Such a connection is successfully achieved with cleverly providing a table shaped engine mount to strategically mitigate the transmission of vibration generated by the engine.

20 Claims, 7 Drawing Sheets

VIBRATION ATTENUATING ENGINE MOUNTING APPARATUS

BACKGROUND OF THE INVENTION

A. Field of the Invention

This invention relates to an engine mounting apparatus that has been modified to reduce vibration transmission induced by an engine used to power a high-volume double diaphragm.

B. Prior Art

High-volume double diaphragm pumps, hereinafter referred to as a pump, are often powered by an internal combustion engine. Internal combustion engines, referred to hereinafter as engines, are known to generate vibrations during operation. Prior art teaches of numerous techniques to mitigate the transmission of vibration resulting from the operation of the engine.

It is well known that if the excitation frequency of the vibrations produced by the engine are substantially close to the natural frequency of the engine mount, the stresses generated by the response of the engine mount may damage the structural frame as well as other parts of the pump.

Additionally, if the engine mount fails to adequately attenuate the vibrations generated by the engine it will transmit, and in some cases amplify, the vibrations into one or more of the structural elements supporting the engine mount, as well as other parts of the pump that are vibrationally coupled to the structural elements supporting the engine mount.

It is well known that vibrations are able to be attenuated by various techniques that include the use of viscoelastic materials and base isolation systems, as well as a combination thereof. However, implementation of these technologies within a pump add costs to the manufacturing process. Furthermore, engine mounts referenced in the prior art typically provide doubler plates, which are installed between the base of the engine mount supports and the structural elements supporting the engine mount. Doubler plates are utilized to redistribute stresses being transferred from the engine mount to mitigate the risk of damaging the structural elements that are attached to the engine mount.

A solution to the above referenced issues is provided by an exemplary embodiment of the present invention described herein, which provides a plurality of unique and novel elements that attenuate vibrations imparted by an engine used to power a high-volume double diaphragm pump.

BRIEF SUMMARY OF THE INVENTION

An exemplary embodiment of the present invention provides a vibration attenuating engine mounting apparatus for a high-volume double diaphragm pump, hereinafter referred to as the pump, that attenuates vibration induced by the engine. The vibration attenuating engine mounting apparatus, hereinafter referred to as the engine mounting apparatus, aims to reduce vibrations transmitted to other parts and components of the pump.

A trailer provides a structural frame that directly supports the engine mounting apparatus. The engine mounting apparatus provides a table shaped profile. The engine mounting apparatus is comprised of a pair of arched portal frames, a pair of side braces, and a top plate. The engine mounting apparatus comprises a first end and a second end.

Each of the arched portal frames span from the first end to the second end of the engine mounting apparatus and provide a pair of support legs. Each support leg is integrally attached to the structural frame of the trailer. The support legs are substantially orthogonal relative to the structural frame of the trailer. The support legs are integrally attached to side braces. The side braces laterally stabilize each support leg in their respective weak axis direction. The side braces provide an arched profile that improves access to areas beneath the engine mounting apparatus. The first side brace is located substantially near the first end of the engine mounting apparatus and the second side brace is located substantially near the second end of the engine mounting apparatus.

The top plate is substantially flat and allows for the attachment of the engine. The top plate is integrally attached to each of the arched portal frames and extends from the first end of the engine mounting apparatus to the second end of the engine mounting apparatus. The profile of the arched portal frames modifies the stiffness of the engine mounting apparatus and reduce its dynamic response to the vibrations induced by the engine. Additionally, the profile of the arched portal frames provides improved access to areas below the top plate of the engine mounting apparatus.

A plurality of elliptical shaped cutouts is provided by the engine mounting apparatus. The plurality of cutouts modifies the stiffness of the engine mounting apparatus and as a result shift the natural frequency of the engine mounting apparatus. The design of the shape, size, orientation, and location of the plurality of cutouts within the engine mounting apparatus aims to optimally shift the natural frequency of the engine mounting apparatus such that the modal response of the engine mounting apparatus is minimized with respect to the excitation frequency induced by the engine. By minimizing the modal response of the engine mounting apparatus, the vibrations transmitted to the structural frame of the trailer, and subsequently other parts and components of the pump, are sufficiently attenuated such that the respective dynamic responses of the structural frame of the trailer, as well as the other parts and components of the pump that are vibrationally coupled with the structural frame, are substantially negligible and thus mitigate any significant damage attributable to transmitted vibrations.

The attenuation provided by the plurality of cutouts allow for omitting the installation of doubler plates. In a typical engine mount, a doubler plate is attached to the base of a support leg of the engine mount to redistribute and reduce stresses imparted to the supporting element(s). The combination of the plurality of cutouts provided by the engine mounting apparatus and modified profile of the engine mounting apparatus allow the support legs to be attached directly to the structural frame of the trailer. Omitting the installation of doubler plates reduces the time and cost associated with manufacturing the pump.

The shape, location, size and orientation of the plurality of cutouts are designed to optimally attenuate vibration in the engine mounting apparatus in order to mitigate the transmission of mechanical vibrations to the structural frame of the trailer as well as other parts of the pump. The plurality of cutouts provides an effective and economical solution to mitigating the transmission of the vibration generated by the engine.

NUMBERING REFERENCE

1—High-Volume Double Diaphragm Pump
2—Engine
3—Trailer
5—Vibration Attenuating Engine Mounting Apparatus
10—Top Plate
11a—First Top Plate Cutout
11b—Second Top Plate Cutout
11c—Third Top Plate Cutout
15—Front Arched Portal Frame
15a—First Support Leg
15b—Second Support Leg
16a—First Support Leg Cutout
16b—Second Support Leg Cutout
20—Rear Arched Portal Frame
20a—Third Support Leg
20b—Fourth Support Leg
21a—Third Support Leg Cutout
21b—Fourth Support Leg Cutout
21c—Fifth Support Leg Cutout
25—First Side Brace
26—First Side Brace Cutout
30—Second Side Brace
31—Second Side Brace Cutout
35—First End
36—Second End
40—Plurality Of Engine Mounting Holes
41—Engine Cover Plate
42—Plurality Of Engine Cover Plate Mounting Holes
43—Plurality Of Vibration Attenuating Notches
50—Alternative Embodiment
55—Exhaust Hose Cutout
60—Exhaust Hose
65—Alternative Front Arched Portal Frame
70—Alternative Top Plate

DETAILED DESCRIPTION OF THE EMBODIMENTS

An exemplary embodiment of a vibration attenuating engine mounting apparatus 5 is provided for a high-volume double diaphragm pump 1. The high-volume double diaphragm pump 1, hereinafter referred to as the pump 1, is mounted on a trailer 3 and is powered by an engine 2. The vibration attenuating engine mounting apparatus 5, hereinafter referred to as the engine mounting apparatus 5, provides multiple geometric improvements that permit the engine mounting apparatus 5 to effectively attenuate vibrations induced by the engine 2.

Figure 1:
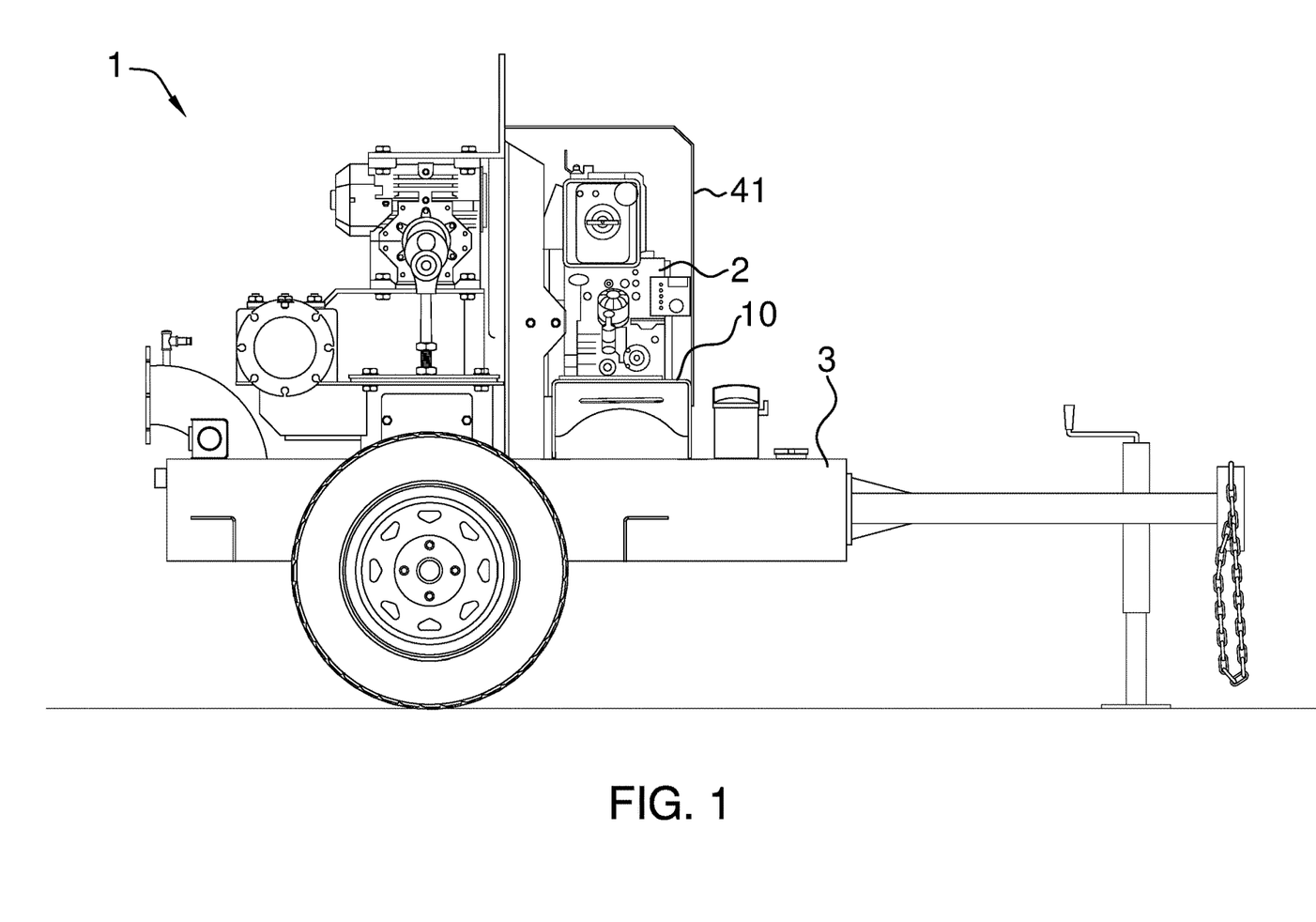
FIG. 1 is a side view of a high-volume double diaphragm pump with an exemplary engine mounting apparatus.
Figure 2:
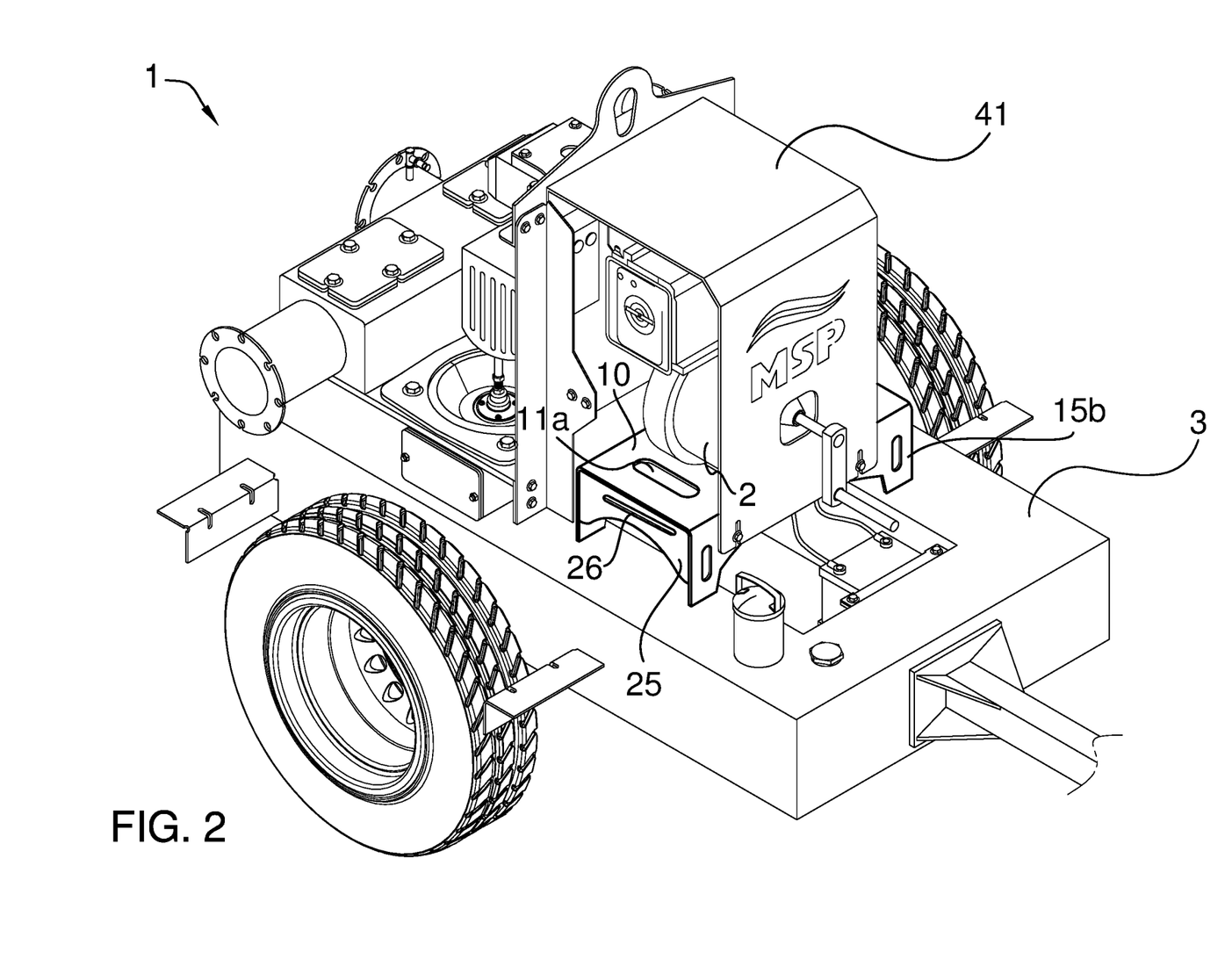
FIG. 2 is an isometric view of the high-volume double diaphragm pump with the exemplary engine mounting apparatus.
Figure 3:
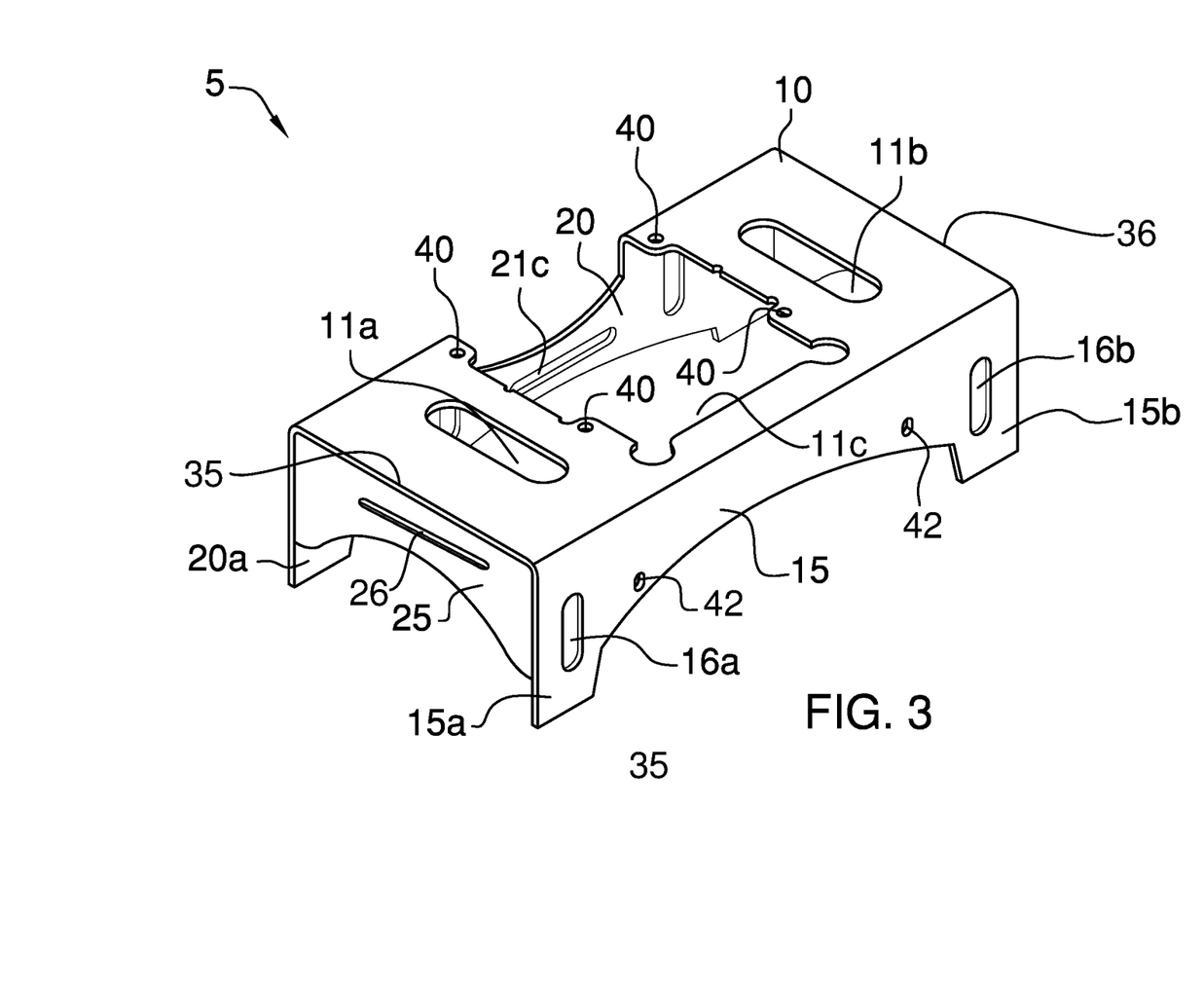
FIG. 3 is a front isometric view of the exemplary engine mounting apparatus.

Referring to FIG. 1, the engine mounting apparatus 5 has a table shaped profile and comprises a first end 35 and a second end 36. The engine mounting apparatus 5 provides a front arched portal frame 15, a rear arched portal frame 20, a top plate 10, a first side brace 25, and a second side brace 30. The top plate 10 is integrally attached to the front arched portal frame 15 and the rear arched portal frame 20 substantially near the top of each of the arched portal frames 15, 20 as shown in FIG. 3.

Each of the arched portal frames 15, 20 provide a pair of support legs. Each respective support leg is attached directly to the structural frame of the trailer 3. In the exemplary embodiment the structural frame of the trailer 3 also serves as the fuel tank for engine 2.

The front arched portal frame 15 extends from the first end 35 of the engine mounting apparatus 5 to the second end 36 of the engine mounting apparatus 5. The front arched portal frame 15 is comprised of a first support leg 15a located substantially near the first end 35 of the engine mounting apparatus 5 and a second support leg 15b located substantially near the second end 36 of the engine mounting apparatus 5. The first support leg 15a provides a first support leg cutout 16a and the second support leg 15b provides a second support leg cutout 16b. The support leg cuts 16a, 16b modify the stiffness of the front arched portal frame 15 and contribute to the attenuation of the vibrations imparted by the engine 2. Additionally, the support leg cutouts 15a, and 15b improve visual access to the parts, components, and areas of the pump 1 that are below the engine mounting apparatus 5. The first support leg 15a and second support leg 15b are each substantially orthogonal to the structural frame of the trailer 3. Each of the support legs 15a, 15b of the front arched portal frame are integrally attached to the structural frame of the trailer 3. Additionally, a plurality of cover plate mounting holes 42 are provided by the front arched portal frame 15. The plurality of cover plate mounting holes 42 allow for an engine cover plate 41 to attach to and detach from the front arched portal frame 15.

Figure 4:
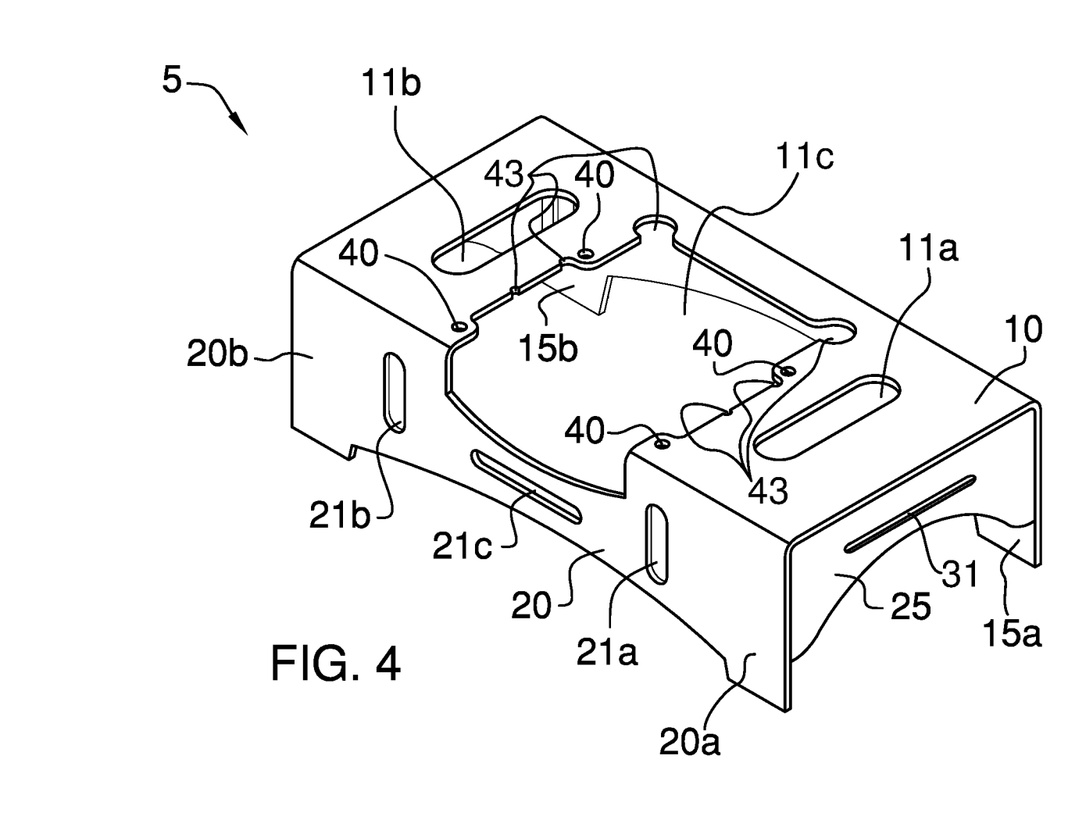
FIG. 4 is a rear isometric view of the exemplary engine mounting apparatus.

The rear arched portal frame 20 extends from the first end 35 of the engine mounting apparatus 5 to the second end 36 of the engine mounting apparatus 5. The rear arched portal frame 20 is comprised of a third support leg 20a located substantially near the first end 35 of the engine mounting apparatus 5 and a fourth support leg 20b located substantially near the second end 36 of the engine mounting apparatus 5. The third support leg 20a provides a third support leg cutout 21a and the fourth support leg 20b provides a fourth support leg cutout 21b. A fifth support leg cutout 21c is provided between the third support leg cutout 21a and the fourth support leg cutout 21b as shown in FIG. 4. The support leg cutouts 21a, 21b, 21c modify the stiffness of the rear arched portal frame 20 and contribute to the attenuation of the vibrations imparted by the engine 2. The third support leg 20a and fourth support leg 20b are each substantially orthogonal to the structural frame of the trailer 3. The third support leg 20a and the fourth support leg 20b are each integrally attached to the structural frame of the trailer 3.

The first side brace 25 is provided substantially near the first end 35 of the engine mounting apparatus 5. The first side brace 25 is integrally attached to the first support leg 15a and the third support leg 20a. The first side brace 25 is non-prismatic and in the exemplary embodiment provides a curved bottom edge. The first side brace 25 is substantially orthogonal to the first support leg 15a and the third support leg 20a.

The second side brace 30 is provided substantially near the second end 35 of the engine mounting apparatus 5. The second side brace 30 is integrally attached to the second support leg 15*b* and the fourth support leg 20*b*. The second side brace 30 is non-prismatic and in the exemplary embodiment provides a curved bottom edge. The second side brace 30 is substantially orthogonal to the second support leg 15*b* and the fourth support leg 20*b*. Both the side braces 25, 30 provide lateral stabilization for each of the support legs 15*a*, 15*b*, 20*a*, 20*b* in their respective weak axis direction. While not shown in the Figures it is anticipated that the first side brace 25 and second side brace 30 are not required to have substantially identical profiles.

A first side brace cutout 26 is provided by the first side brace 25. A second side brace cutout 31 is provided by the second side brace 30. The center of the first side brace cutout 26 and the center of the second side brace cutout 31 are substantially aligned with each other as well as the centers of the first side brace 25 and second side brace 30.

The top plate 10 is substantially flat and is substantially orthogonal to the front arched portal frame 15 and the rear arched portal frame 20. The top plate 10 extends from the first end 35 of the engine mounting apparatus 5 to the second end 36 of the engine mounting apparatus 5. The top plate 10 provides a plurality of top plate cutouts, which are comprised of a first top plate cutout 11*a*, a second top plate cutout 11*b*, and a third top plate cutout 11*c*. The top plate cutouts 11*a*, 11*b*, 11*c* increase the attenuation of vibrations propagating through the top plate 10.

The first top plate cutout 11*a* is located nearest to the first end 35 relative to the second top plate cutout 11*b* and third top plate cutout 11*c*. The second top plate cutout 11*b* is located nearest to the second end relative to the first top plate cutout 11*a* and third top plate cutout 11*c*. The third top plate cutout 11*c* is located between the first top plate cutout 11*a* and the second top plate cutout 11*b*. It is anticipated that the first top plate cutout and second top plate cutout may not be substantially equidistant from the midpoint between the first end of the vibration attenuating engine mounting apparatus and the second end of the vibration attenuating engine mounting apparatus. The third top plate cutout 11*c* allows the engine 2 to partially sit below the top plate 10 and substantially forms to the profile of the engine 2. The third top plate cutout 11*c* provides a plurality of vibration attenuating notches 43 around its perimeter to accommodate the profile of the engine 2 as shown in FIG. 4. In addition to allowing the engine 2 to be seated below the top plate 10, the plurality of vibration attenuating notches 43 assist in reducing vibrations induced by the engine 2. While it is not shown in the Figures, it is anticipated that the other cutouts in the engine mount can provide a plurality of notches 43 as well.

A plurality of engine mounting holes 40 are provided adjacent to the third top plate cutout 11*c*. In the exemplary embodiment the engine 2 is attached to the top plate 10 by a plurality of bolts. However, it is anticipated that the engine 2 may be attached to the top plate 10 using other forms of attachment.

Figure 5:
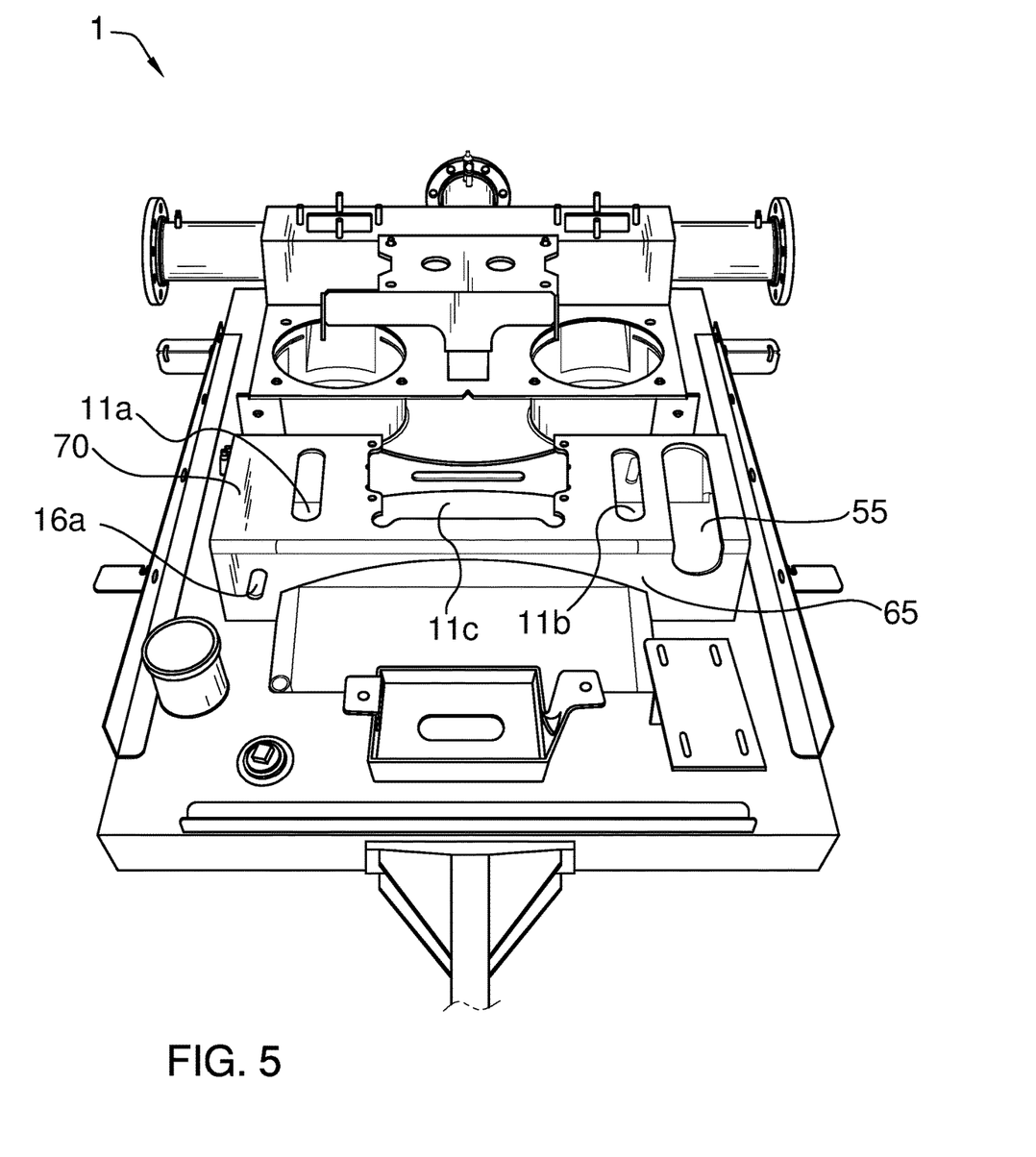
FIG. 5 is front perspective view of the high-volume double diaphragm pump with an alternative exemplary engine mounting apparatus.
Figure 6:
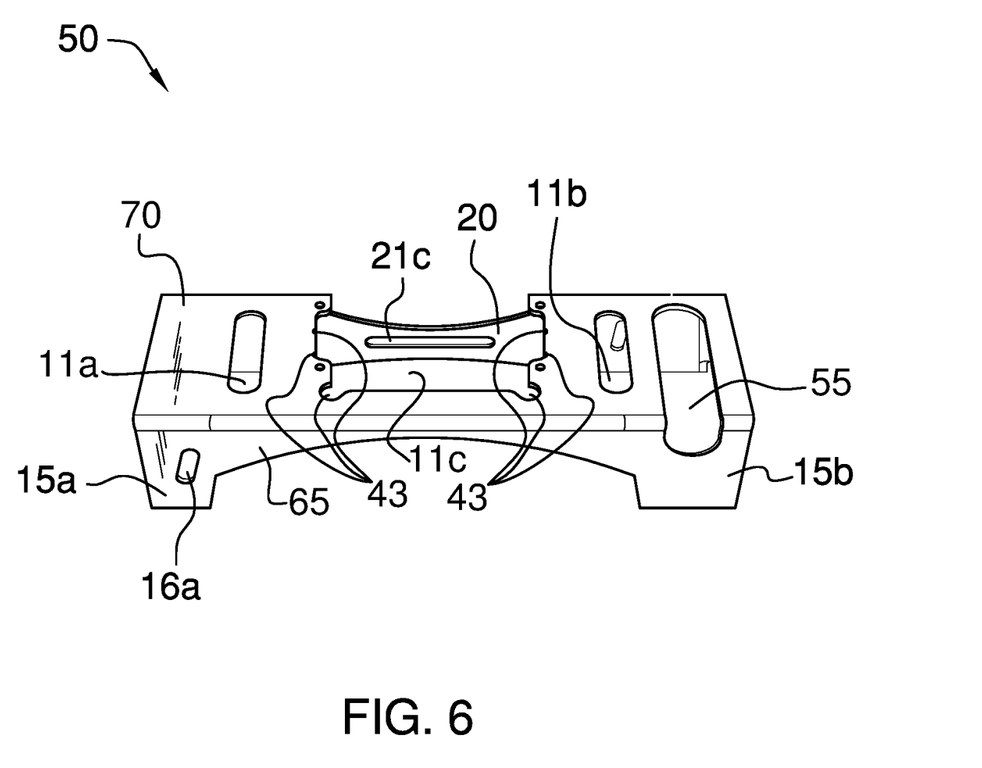
FIG. 6 is a front perspective view of the alternative exemplary engine mounting apparatus.
Figure 7:
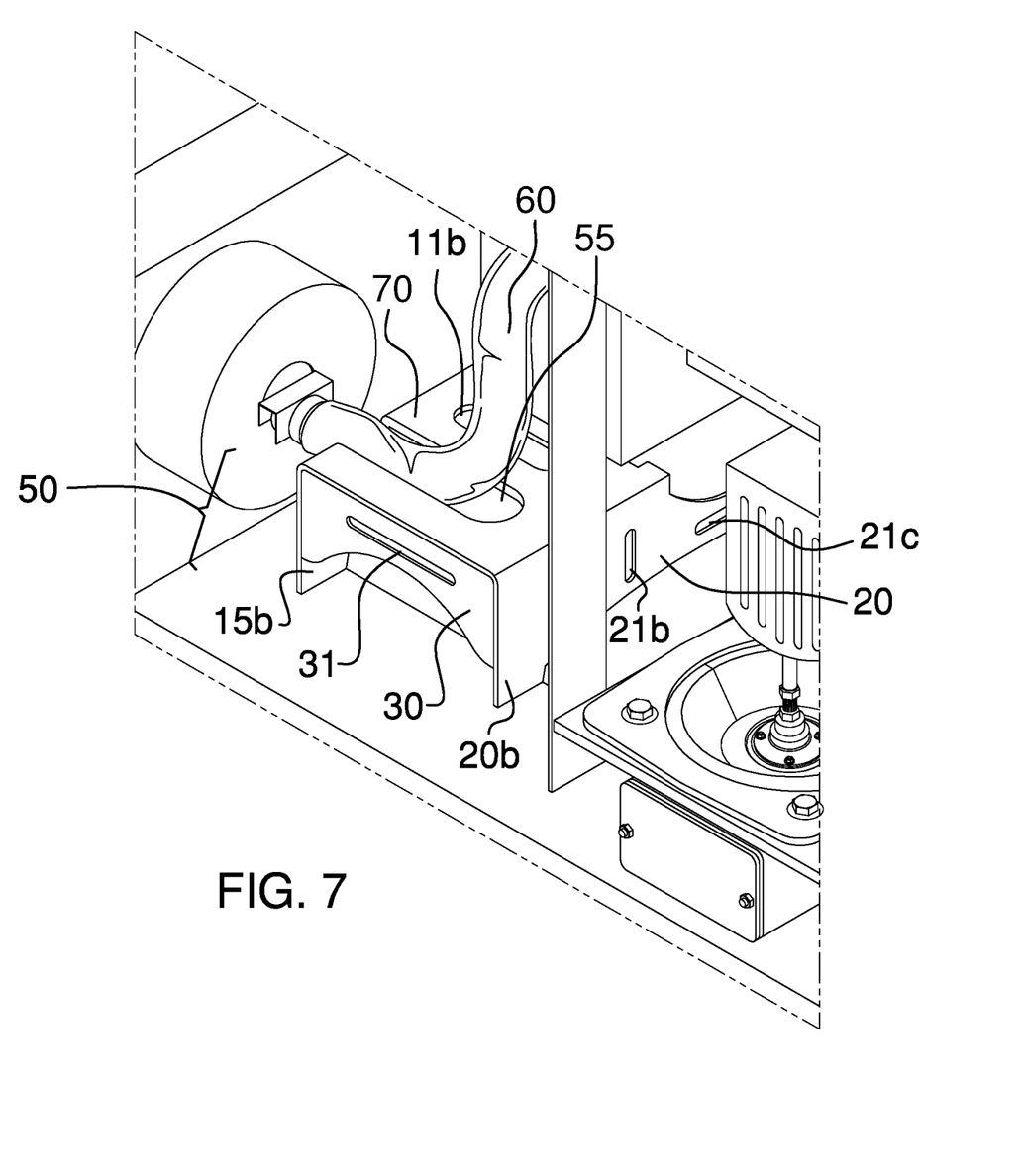
FIG. 7 is an isometric view of the alternative exemplary engine mounting apparatus with an exhaust hose installed.

Referring to FIG. 4-6, an alternative embodiment 50 provides an alternative top plate 70 that provides an exhaust hose cutout 55 to allow for sufficient space to attach an engine exhaust hose 60 to the engine 2 when a noise reducing housing is installed over the pump 1. The exhaust hose cutout 55 is provided adjacent to the second top plate cutout 11*b*. The exhaust hose cutout 55 extends into the alternative front arched portal frame 65. The exhaust hose cutout 55 contributes to the vibration attenuation and as a result a second support leg cutout 16*b* is not needed. However, while it is not preferred nor shown in the Figures, it is anticipated that the alternative embodiment 50 could comprise a second support leg 15*b* that provides a cutout.

While the embodiments of the invention have been disclosed, certain modifications may be made by those skilled in the art to modify the invention without departing from the spirit of the invention.

The inventor claims:

1. A vibration attenuating engine mounting apparatus for a high-volume double diaphragm pump comprising a table shaped profile, the table shaped profile comprising:
   a. a front arched portal frame;
   wherein the front arched portal frame extends from a first end of the vibration attenuating engine mounting apparatus to a second end of the vibration attenuating engine mounting apparatus;
   wherein the front arched portal frame provides a first support leg located substantially near the first end of the vibration attenuating engine mounting apparatus;
   wherein the front arched portal frame provides a second support leg located substantially near the second end of the vibration attenuating engine mounting apparatus;
   wherein the first support leg provides a first support leg cutout;
   wherein the first support leg and the second support leg are integrally attached to a structural frame of a trailer;
   b. a rear arched portal frame;
   wherein the rear arched portal frame extends from the first end of the vibration attenuating engine mounting apparatus to the second end of the vibration attenuating engine mounting apparatus;
   wherein the rear arched portal frame provides a third support leg located substantially near the first end of the vibration attenuating engine mounting apparatus;
   wherein the rear arched portal frame provides a fourth support leg located substantially near the second end of the vibration attenuating engine mounting apparatus;
   wherein the third support leg provides a third support leg cutout;
   wherein the fourth support leg provides a fourth support leg cutout;
   wherein the third support leg and the fourth support leg are integrally attached to the structural frame of the trailer;
   c. a top plate;
   wherein the top plate extends from the first end of the vibration attenuating engine mounting apparatus to the second end of the vibration attenuating engine mounting apparatus;
   wherein the top plate comprises a first top plate cutout, a second top plate cutout, and a third top plate cutout;
   wherein the first top plate cutout is nearest the first end of the engine mounting apparatus relative to the second top plate cutout and the third top plate cutout;
   wherein the second top plate cutout is nearest the second end of the vibration attenuating engine mounting apparatus relative to the first top plate cutout and the third top plate cutout;
   wherein the third top plate cutout is located between the first top plate cutout and the second top plate cutout;
   wherein a plurality of engine mounting holes is provided adjacent to the third top plate cutout;
   d. a first side brace;
   wherein the first side brace is provided substantially near the first end of the vibration attenuating engine mounting apparatus;
   wherein the first side brace comprises a non-prismatic profile;
   wherein the first side brace is integrally attached to the first support leg and the third support leg;

wherein the first side brace provides a first side brace cutout that is centered between the first support leg and the third support leg;

e. a second side brace;

wherein the second side brace is provided at the second end of the vibration attenuating engine mounting apparatus;

wherein the second side brace comprises a non-prismatic profile;

wherein the second side brace is integrally attached to the second support leg and the fourth support leg;

wherein the second side brace provides a second side brace cutout that is centered between the second support leg and the fourth support leg.

2. The vibration attenuating engine mounting apparatus of claim 1, wherein structural frame of the trailer comprises a fuel tank.

3. The vibration attenuating engine mounting apparatus of claim 1, wherein the first top plate cutout and second top plate cutout are substantially equidistant from the midpoint between the first end of the vibration attenuating engine mounting apparatus and the second end of the vibration attenuating engine mounting apparatus.

4. The vibration attenuating engine mounting apparatus of claim 1, wherein the first top plate cutout and second top plate cutout are not substantially equidistant from the midpoint between the first end of the vibration attenuating engine mounting apparatus and the second end of the vibration attenuating engine mounting apparatus.

5. The vibration attenuating engine mounting apparatus of claim 1, wherein the center of the third top plate cutout is centered between the first top plate cutout and the second top plate cutout.

6. The vibration attenuating engine mounting apparatus of claim 1, wherein the front arched portal frame and rear arched portal frame are substantially orthogonal to the structural frame of the trailer.

7. The vibration attenuating engine mounting apparatus of claim 1, wherein the first side brace is substantially orthogonal to the front arched portal frame and rear arched portal frame.

8. The vibration attenuating engine mounting apparatus of claim 1, wherein the second side brace is substantially orthogonal to the front arched portal frame and rear arched portal frame.

9. The vibration attenuating engine mounting apparatus of claim 1, wherein the third top plate cutout provides a plurality of vibration attenuating notches at its perimeter.

10. The vibration attenuating engine mounting apparatus of claim 1, wherein the third top plate cutout extends from the top plate to the rear arched portal frame.

11. A vibration attenuating engine mounting apparatus for a high-volume double diaphragm pump comprising a table shaped profile, the table shaped profile comprising:

a. a front arched portal frame;

wherein the front arched portal frame extends from a first end of the vibration attenuating engine mounting apparatus to a second end of the vibration attenuating engine mounting apparatus;

wherein the front arched portal frame provides a first support leg located substantially near the first end of the vibration attenuating engine mounting apparatus;

wherein the front arched portal frame provides a second support leg located substantially near the second end of the vibration attenuating engine mounting apparatus;

wherein the first support leg provides a first support leg cutout;

wherein the first support leg and the second support leg are integrally attached to a structural frame of a trailer;

b. a rear arched portal frame;

wherein the rear arched portal frame extends from the first end of the vibration attenuating engine mounting apparatus to the second end of the vibration attenuating engine mounting apparatus;

wherein the rear arched portal frame provides a third support leg located substantially near the first end of the vibration attenuating engine mounting apparatus;

wherein the rear arched portal frame provides a fourth support leg located substantially near the second end of the vibration attenuating engine mounting apparatus;

wherein the third support leg provides a third support leg cutout;

wherein the fourth support leg provides a fourth support leg cutout;

wherein the third support leg and the fourth support leg are integrally attached to the structural frame of the trailer;

c. a top plate;

wherein the top plate extends from the first end of the vibration attenuating engine mounting apparatus to the second end of the vibration attenuating engine mounting apparatus;

wherein the top plate comprises a first top plate cutout, a second top plate cutout, a third top plate cutout, and an exhaust hose cutout;

wherein the first top plate cutout is nearest the first end of the engine mounting apparatus relative to the second top plate cutout and the third top plate cutout;

wherein the second top plate cutout is nearest the second end of the vibration attenuating engine mounting apparatus relative to the first top plate cutout and the third top plate cutout;

wherein the third top plate cutout is located between the first top plate cutout and the second top plate cutout;

wherein the exhaust hose cutout is provided in the top plate and extends into the front arched portal frame;

wherein a plurality of engine mounting holes is provided adjacent to the third top plate cutout;

d. a first side brace;

wherein the first side brace is provided substantially near the first end of the vibration attenuating engine mounting apparatus;

wherein the first side brace comprises a non-prismatic profile;

wherein the first side brace is integrally attached to the first support leg and the third support leg;

wherein the first side brace provides a first side brace cutout that is centered between the first support leg and the third support leg;

e. a second side brace;

wherein the second side brace is provided at the second end of the vibration attenuating engine mounting apparatus;

wherein the second side brace comprises a non-prismatic profile;

wherein the second side brace is integrally attached to the second support leg and the fourth support leg;

wherein the second side brace provides a second side brace cutout that is centered between the second support leg and the fourth support leg.

12. The vibration attenuating engine mounting apparatus of claim 11, wherein structural frame of the trailer comprises a fuel tank.

13. The vibration attenuating engine mounting apparatus of claim 11, wherein the first top plate cutout and second top plate cutout are substantially equidistant from the midpoint between the first end of the vibration attenuating engine mounting apparatus and the second end of the vibration attenuating engine mounting apparatus.

14. The vibration attenuating engine mounting apparatus of claim 11, wherein the first top plate cutout and second top plate cutout are not substantially equidistant from the midpoint between the first end of the vibration attenuating engine mounting apparatus and the second end of the vibration attenuating engine mounting apparatus.

15. The vibration attenuating engine mounting apparatus of claim 11, wherein the center of the third top plate cutout is centered between the first top plate cutout and the second top plate cutout.

16. The vibration attenuating engine mounting apparatus of claim 11, wherein the front arched portal frame and rear arched portal frame are substantially orthogonal to the structural frame of the trailer.

17. The vibration attenuating engine mounting apparatus of claim 11, wherein the first side brace is substantially orthogonal to the front arched portal frame and rear arched portal frame.

18. The vibration attenuating engine mounting apparatus of claim 11, wherein the second side brace is substantially orthogonal to the front arched portal frame and rear arched portal frame.

19. The vibration attenuating engine mounting apparatus of claim 11, wherein the third top plate cutout provides a plurality of vibration attenuating notches at its perimeter.

20. The vibration attenuating engine mounting apparatus of claim 11, wherein the third top plate cutout extends from the top plate to the rear arched portal frame.

\* \* \* \* \*